United States Patent

Anquetin

Patent Number: 5,263,803
Date of Patent: Nov. 23, 1993

[54] ANCHOR BOLT

[75] Inventor: Robert P. Anquetin, Etrechy, France

[73] Assignee: Emhart Inc., Newark, Del.

[21] Appl. No.: 59,056

[22] Filed: May 7, 1993

[30] Foreign Application Priority Data

May 13, 1992 [GB] United Kingdom ............... 9210235

[51] Int. Cl.⁵ .................. F16B 13/04; F16B 13/06
[52] U.S. Cl. .................................. 411/31; 411/55; 411/65
[58] Field of Search ............... 411/30, 31, 55, 43, 411/65, 3-5

[56] References Cited

U.S. PATENT DOCUMENTS

| | | | |
|---|---|---|---|
| 4,518,290 | 5/1985 | Frischmann et al. | 411/30 |
| 4,575,294 | 3/1986 | Mermi et al. | 411/30 |
| 4,702,654 | 10/1987 | Frischmann et al. | 411/31 |
| 4,789,284 | 12/1988 | White | 411/3 |

Primary Examiner—Neill R. Wilson
Attorney, Agent, or Firm—Edward D. Murphy

[57] ABSTRACT

Sleeve anchor comprising a tapered stem increasing in section to form a head at one end, at least the end portion of the stem remote from the head being threaded, a tubular sleeve placed over said stem being retained between the head and a threaded retaining member screwed onto the threaded end of the stem and in which the retaining member may also serve to hold a component to be attached to the anchor. Ratchet teeth are provided on the inner face of the retaining member and on the end of the tubular sleeve adjacent to the retaining member whereby in operation the two sets of teeth are engaged so that the sleeve is positively rotated with the retaining member and the outer wall of the tubular sleeve is further provided with radially-directed cutting teeth which engage the walls of the bore hole into which the anchor is inserted as the tubular sleeve is simultaneously rotated and expanded by the action of the tapered stem. The action of the cutting teeth serves to enhance the grip of the anchor in the bore hole.

7 Claims, 2 Drawing Sheets

ANCHOR BOLT

BACKGROUND OF THE INVENTION

The present invention relates to an anchor bolt of the kind known as a sleeve anchor and comprising a tapered stem increasing in section to form a head at one end and the end portion of the stem remote from the head being threaded, a tubular sleeve placed over said stem being retained between the head and a threaded retaining member screwed onto the threaded end of the stem. The retaining member may also serve to hold a component to be attached to the anchor bolt.

In use, the anchor bolt is inserted head first into a pre-prepared bore hole drilled in the concrete or masonry body to which articles are to be affixed. After assembly of the articles, the retaining member is then screwed further on to the thread so that the tubular sleeve is expanded as the tapered stem is drawn into the tubular sleeve and the distortion of the tubular sleeve so caused serves to retain the anchor in the pre-prepared bore hole.

It is an object of the present invention to provide an improved sleeve anchor with increased holding power.

SHORT DESCRIPTION OF THE INVENTION

According to the present invention, an anchor bolt is provided comprising a stem having a tapered stem increasing in section to form a head at one end, at least the end portion of the stem remote from the head being threaded, a tubular sleeve placed over said stem being retained between the head and a threaded retaining member screwed onto the threaded end of the stem characterised in that ratchet teeth are provided on the inner face of the retaining member and on the end of the tubular sleeve adjacent to the retaining member, the arrangement being such that in operation the two sets of teeth are engaged so that the sleeve is positively rotated with the retaining member and the outer wall of the tubular sleeve is further provided with radially-directed cutting teeth which engage the walls of the bore hole in which the anchor bolt is inserted as the tubular sleeve is simultaneously rotated and expanded by the action of the tapered stem. The action of the cutting teeth thus serves to enhance the grip of the anchor in the bore hole.

An indicator may be provided on the stem to show when the tapered stem has been drawn a predetermined distance into the tubular sleeve, e.g. when a desired setting position is reached.

In operation, a plain hole is bored into the concrete to a depth equal to the length of the fixing plus say 5 mm. The anchor is inserted head first into the bore hole. As torque is applied to the retaining member the ratchet teeth on the retaining member engage with those on the end of the sleeve so that the sleeve and the retaining member rotate together. At the same time, the central stem is prevented from rotating, e.g. by applying a spanner to flats formed on the end of the stem, and the tapered stem is drawn slowly back through the sleeve causing it to expand. In doing so, the teeth on the outer wall of the sleeve, which are formed with a slight relief to aid cutting, engage in the sides of the hole and gradually carve an undercut feature in the concrete as the sleeve is simultaneously expanded and rotated. The sleeve anchor is thus fixed in place so well that even when the concrete is cracked there is sufficient engagement in the hole to maintain good performance.

The cutting teeth are preferably located at the inner end of the tubular sleeve, that is, at the end remote from the ratchet teeth in one end of the sleeve.

SHORT DESCRIPTION OF THE DRAWINGS

In order that the present invention can be better understood, a preferred embodiment will now be described in greater detail by way of example with reference to the accompanying drawings in which.

DETAILED DESCRIPTION OF EMBODIMENT AND DRAWINGS

Figure 1:
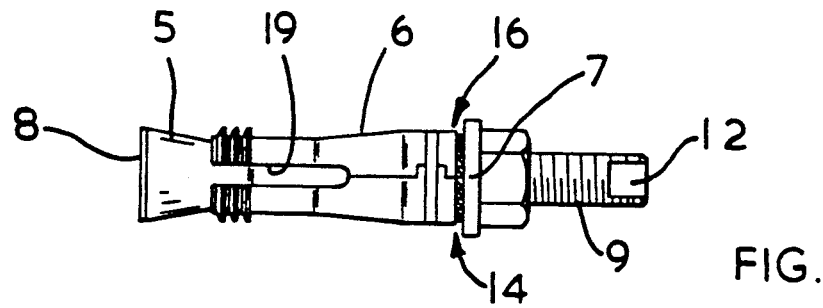
FIG. 1 is a side view of an unset sleeve anchor assembly according to the invention.
Figure 3:
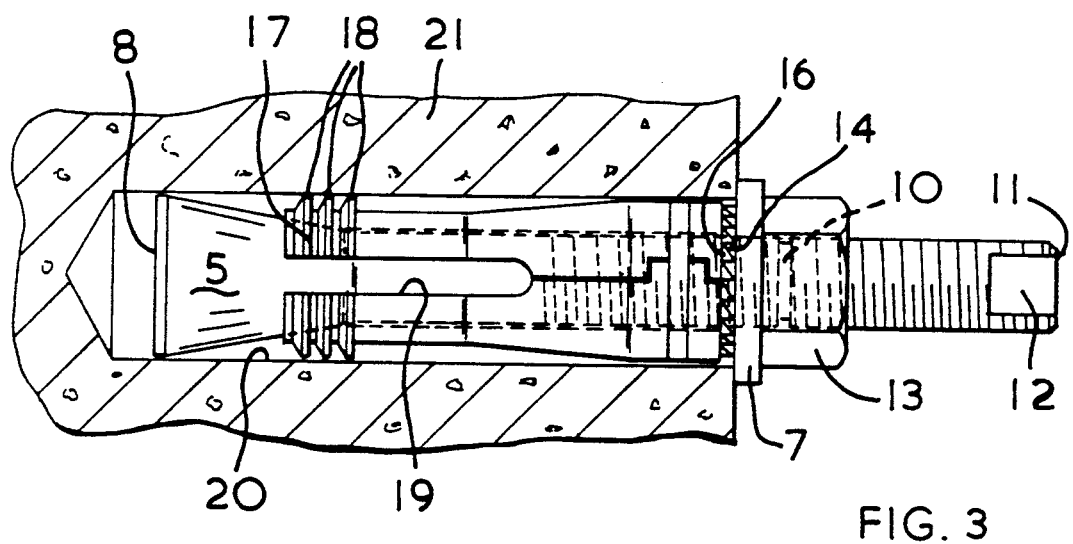
FIG. 3 shows, on a still larger scale, the anchor of FIG. 1 inserted in a blind hole bored in masonry or concrete.
Figure 4:
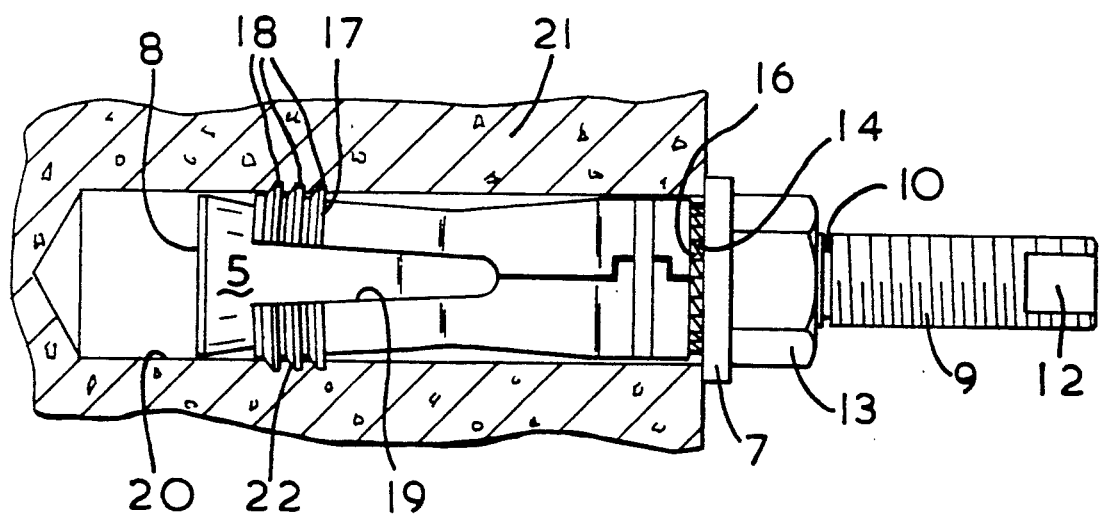
FIG. 4 shows the anchor of FIG. 3 when fully set.
Figure 2:
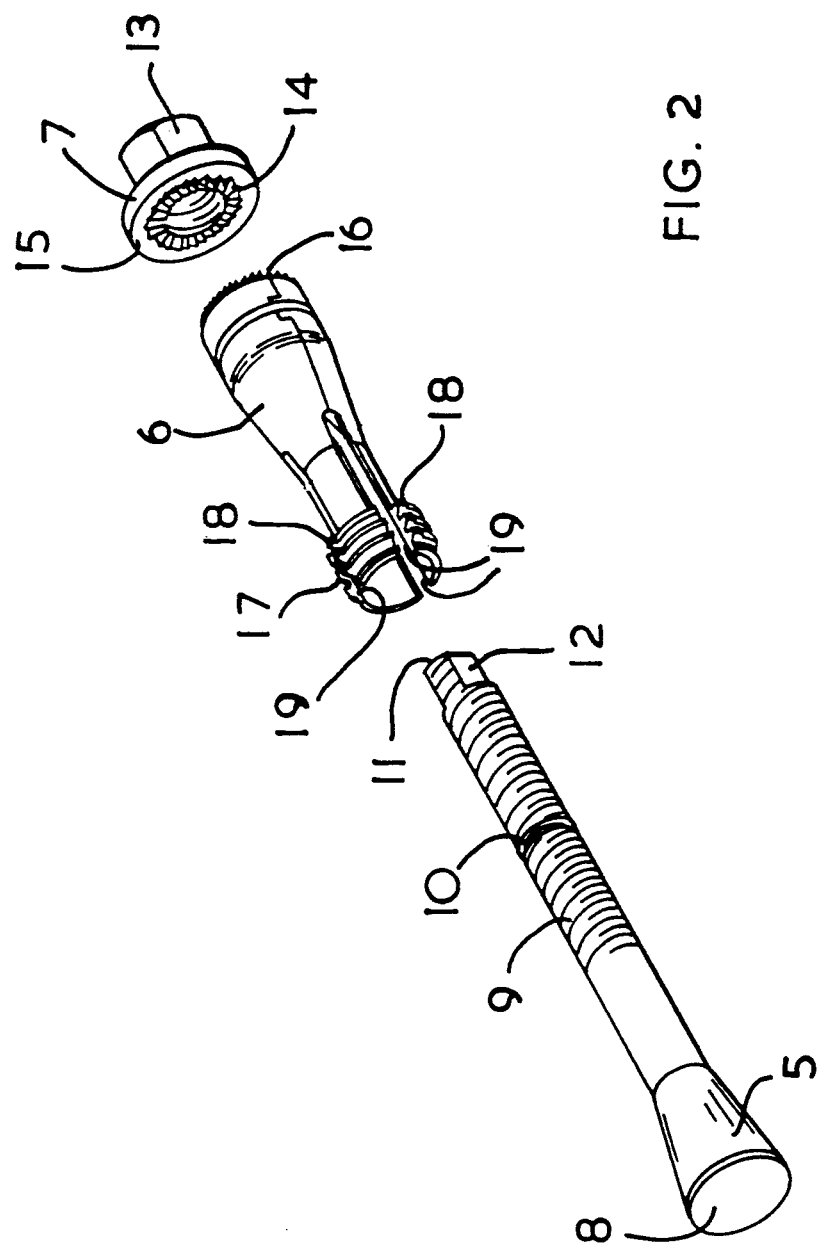
FIG. 2 is an exploded view, on a larger scale, of the anchor of FIG. 1.

The sleeve anchor according to the invention comprises a tapered stem 5, a tubular sleeve 6 and a retaining member 7. Stem 5 tapers from head 8 to a plain diameter section, end portion 9 of which is threaded. Groove 10, formed by removing one turn of thread, forms an indicator at a predetermined distance from end 11 of threaded portion 9 of the stem 5. Holding flats 12 are formed at end 11 of stem 5. Retaining member 7 is formed as a hexagon nut 13 with ratchet teeth 14 formed in its inner face 15. Ratchet teeth 16 are formed at one end of tubular sleeve 6 and three ridges 17 are provided on the outer wall at the other end of sleeve 6, portions of the ridges 17 being formed as cutting teeth 18. Three slots 19 abut half the length of tubular sleeve 6 divide the lower half of sleeve 6 into deformable legs.

In an alternative embodiment (not shown) the ends of slots 19 are bridged by frangible webs which serve to preserve the structural integrity of the slotted sleeve before setting to ensure free passage into the bore hole (the so-called "drop-in" facility) but which break readily as the taper is introduced into the sleeve so that the deformable legs are readily expanded.

To install the fasteners, a plain blind hole 20 is bored in a concrete or masonry mass 21 having a diameter equal to the external diameter of the head 8 and sleeve 6 and a depth slightly greater than the working length of the anchor.

The anchor is then inserted head first in the hole up to its working length, i.e. until the retaining member abuts the face of the concrete mass.

A spanner or wrench is then applied to hexagon nut 13 which is turned on threaded portion 9 so that the head 8 is drawn into sleeve 6 so that the slotted portion is readily expanded and the ridges 17 and cutting teeth 18 thereby forced into contact with the wall of the hole 20 at 22. At the same time, ratchet teeth 14 formed in the inner face 15 of retaining member 7 engage the ratchet teeth 16 formed at one end of sleeve 6 so that sleeve 6, being locked to the retaining member 7, is rotated in hole 20 as hexagon nut 13 is rotated, the holding flats 12 being gripped tightly to prevent rotation of stem 5. This causes the cutting teeth 18 to cut progressively into the wall of hole 20 as the retaining member 7 is rotated and head 8 drawn further into sleeve 6. As head 8 is drawn further into sleeve 6 and the cutting teeth 18 cut deeper into the wall of the hole 20, the groove 10 is moved through the retaining member 7 and becomes visible after five turns of hexagon nut 13, thus indicating that the anchor is fully set.

The performance of the anchor is found to be very good and it is notably efficient in deteriorating structures such as cracking concrete.

I claim:

1. An anchor bolt comprising a stem having a tapered stem increasing in section to form a head at one end, at least the end portion of the stem remote from the head being threaded, a tubular sleeve placed over said stem being retained between the head and a threaded retaining member screwed onto the threaded end of the stem wherein ratchet teeth are provided on the inner face of the retaining member and on the end of the tubular sleeve adjacent to the retaining member, the arrangement being such that in operation the two sets of teeth are engaged so that the sleeve is positively rotated with the retaining member and the outer wall of the tubular sleeve is further provided with radially-directed cutting teeth which engage the walls of the base in which the anchor bolt is inserted as the tubular sleeve is simultaneously rotated and expanded by the action of the tapered stem.

2. An anchor bolt according to claim 1, wherein the cutting teeth are located at the inner end of the tubular sleeve, at the end remote from the ratchet teeth in the end of the sleeve.

3. An anchor bolt according to claim 1 or 2, wherein holding flats are formed at the end of the threaded stem which may be gripped to prevent rotation of the stem when the retaining member is screwed onto the threaded stem.

4. An anchor bolt according to claim 1 or 2, wherein an indicator is provided on the stem to show when the tapered stem has been drawn a predetermined distance into the tubular sleeve and a desired setting position is reached.

5. An anchor bolt according to claim 1, wherein the end of the sleeve carrying the cutting teeth is divided into a plurality of deformable legs by a number of longitudinal slots.

6. An anchor bolt according to claim 5, wherein the end of the sleeve carrying the cutting teeth is divided into three deformable legs by three longitudinal slots.

7. An anchor bolt according to claim 1, 2 or 5, wherein the cutting teeth are provided as three ridges formed with faces to provide cutting edges.

* * * * *